United States Patent Office 3,751,492
Patented Aug. 7, 1973

3,751,492
PREPARATION OF SODIUM AND POTASSIUM FLUOROETHYLENES
Serge Y. Delavarenne, Wemmel, Belgium, assignor to Union Carbide Corporation, New York, N.Y.
No Drawing. Filed Dec. 18, 1970, Ser. No. 99,710
Int. Cl. C07c 21/18
U.S. Cl. 260—653.3                                 8 Claims

ABSTRACT OF THE DISCLOSURE

Sodium fluoroethylenes and potassium fluoroethylenes are conveniently prepared by a process which comprises reacting fluoroethylenes containing at least one hydrogen with sodium amide or potassium amide respectively, in a reaction media comprised of hexamethylphosphoramide and either tetrahydrofuran or an ether. The resulting fluoroethenyl compounds, especially the trifluorovinyl derivatives, are intermediates for the preparation of fluorovinyl monomers and insecticides.

---

This invention relates to the preparation of sodium and potassium fluoroethylenes. In one aspect, this invention relates to the preparation of sodium and potassium fluorochloroethylenes. In a further aspect, the invention is directed to the reaction of fluoroethylenes with sodium and potassium amide. In a still further aspect, this invention relates to a process for introducing fluoroethenyl groups into organic compounds, such as, for example, in the preparation of fluorovinylmonomers and in the synthesis of insecticides.

In recent years, various methods have been disclosed in the literature relating to the preparation of halogenated alkali-metal organic compounds. For instance, in German Pat. 1,215,708 which was granted May 5, 1966 there is disclosed a process for the preparation of alkali-metal derivatives of dichloroethylenes and trichloroethylenes. Similarly, the work of P. Tarrant et al., J. Org. Chem. 28, 839 (1963) disclosed the preparation of trifluorovinyl lithium from trifluorobromoethylene and lithium butyl. Perfluorovinyl lithiums have also been reported by D. Seyferth et al. in J. Am. Chem. Soc. 84, 4266 (1962). More recently, a method has been devised, as disclosed in copending application, Ser. No. 655,286, filed July 24, 1967, now Pat. No. 3,506,728 for the preparation of lithium fluorochloroethylenes by the reaction of a fluorochloroethylene with a lithium amide. This reaction must be conducted at low temperatures and requires the use of a relatively expensive reagent. Since one of the preferred uses for alkali-metal fluoroethylenes is the introduction of a fluoroethenyl group into organic compounds, the particular alkali-metal employed is not critical. Hence, it would be more advantageous to use a less expensive metal and reaction conditions which do not require such low temperatures.

It is therefore an object of this invention to provide a process for the preparation of sodium and potassium fluoroethylenes. Another object of the invention is to provide a process for the preparation of sodium and potassium fluorochloroethylenes. A further object of the invention is to provide a process for the preparation of sodium and potassium trifluoroethylene. A still further object of this invention is to provide a process for introducing fluoroethenyl groups into organic compounds. These and other objects will readily become apparent to those skilled in the art in the light of the teachings herein set forth.

In its broad aspect, the invention relates to a process for producing sodium and potassium fluoroethylenes and their use in introducing fluoroethenyl groups into organic compounds. The sodium and potassium fluoroethylenes which are prepared by the process of this invention can be represented by the formula:

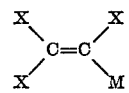

wherein M represents sodium or potassium, at least two X's represent a fluorine atom, and the remaining X's represent a member selected from a group consisting of hydrogen, fluorine, chlorine, or alkyl, fluoroalkyl, perfluoroalkyl, cycloalkyl, fluorocycloalkyl, perfluorocycloalkyl, phenyl, fluorophenyl and perfluorophenyl of up to 8 carbon atoms. The process comprises contacting in an inert atmosphere and at a temperature within the range of from about $-20°$ to about $+10°$ C., sodium or potassium amide and a fluoroethylene of the formula:

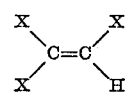

wherein X has the same value as above. The process is conducted in a reaction media comprised of hexamethylphosphoramide and either tetrahydrofuran or an organic ether.

The process of this invention is useful for the preparation of several sodium and potassium fluoroethylenes. Among the compositions which can be prepared are sodium trifluoroethylene, cis and trans 1-sodium-1-chloro-2,2-difluoroethylene, cis and trans 1-sodium-1-fluoro-2,2-dichloroethylene, potassium trifluoroethylene, cis and trans 1-potassium-1-chloro-2,3-difluoroethylene, cis and trans 1-potassium-1-fluoro-2,2-dichloroethylene, cis and trans 1-sodium perfluoropropene, cis and trans 1-sodium perfluoroisobutene, cis and trans 1-potassium perfluoropropene, cis and trans 1-potassium perfluoroisobutene, and the like.

It has been observed that it is critical to the successful practice of the invention that the sodium or potassium fluoroethylenes be prepared in a particular reaction media. The reaction media employed is comprised of hexamethylphosphoramide and either tetrahydrofuran or an ether. Suitable ethers which can be employed include, among others, diethyl ether, dipropyl ether, dibutyl ether, and the like. The preferred reaction media contains tetrahydrofuran and hexamethylphosphoramide in a respective volume ratio of about 9 to 1.

As indicated in the examples the desired compositions can be prepared by adding a mixture of the fluoroethylene and tetrahydrofuran to a suspension of sodium or potassium amide in a mixture of tetrahydrofuran and hexamethylphosphoramide. Alternatively, the fluoroethylene can be contained in a mixture of tetrahydrofuran and hexamethylphosphoramide and the amide added.

The reaction is conducted in an inert atmosphere, such as nitrogen, and at a temperature within the range of from about $-20°$ C. to about $+10°$ C. the preferred temperature is $-10°$ C.

As hereinbefore indicated, the invention also relates to the preparation of intermediates for the preparation of fluorovinyl monomers and insecticides, by the introduction of fluoroethenyl groups into organic compounds. The process comprises contacting the organic compound with a sodium or potassium fluoroethylene in an inert atmosphere at a temperature below about 10° C.

The organic compounds which are suitable for the introduction of the fluoroethenyl group can be one of a wide variety of compositions and need only be characterized by the presence of a group capable of reacting with a sodium or potassium ethylene in either addition or substitution reactions. Illustrative compounds for addition reactions include, among others, those characterized by the presence of unsaturated groups, such as,

and the like. Illustrative compounds for substitution reactions include, among others, those characterized by the presence of an atom or group of atoms subject to nucleophilic displacement. Hence, it will be readily apparent that the process of this aspect of the invention is applicable to a wide range of products such as olefins, ketones, aldehydes, esters, halo silanes, halo sulfides, halo esters, and the like.

For example, sodium and potassium trifluoroethylene react readily with carbonyl-containing compositions as illustrated in the following reactions:

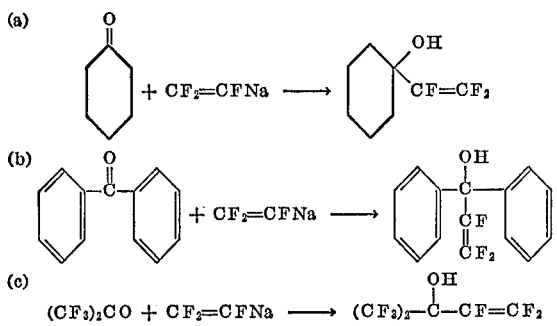

The product of reaction (c) is an intermediate to the corresponding carbamate which has known insecticidal properties.

In practice, the introduction of the fluoroethenyl groups into the organic compound is conveniently effected by contacting the sodium or potassium fluoroethylene and the organic compound in an inert atmosphere, e.g., nitrogen, at a temperature of about 10° C., followed by acid hydrolysis.

Recovery and purification of the desired product can thereafter be effected by known techniques.

In practice, it has also been observed that the reaction for introducing fluoroethenyl groups into organic compounds can be conducted in the same reaction media in which the sodium or potassium fluoroethylene is formed. For example, the addition of sodium amide to the media can be followed by the addition of a carbonyl-containing composition such as cyclohexanone. The carbonyl-containing composition can also be present in the reaction media prior to the introduction of the sodium or potassium amide.

The compositions which are prepared by the process of this invention are useful in a wide variety of applications. For example, it has been observed that compounds, such as trifluorovinyl cyclohexyl carbinol can be esterified with acids to provide esters having utility as plasticizers for numerous resin systems. Moreover, due to the presence of the hydroxyl group this compound can react with isocyanates to form urethanes containing fluoro groups. Urethanes are themselves of great interest as protective coatings, foams, and the like.

The following examples are illustrative.

EXAMPLE 1

Preparation of sodium trifluoroethylene 50 millimoles of trifluoroethylene was condensed under vacuo at liquid nitrogen temperature in a 500 milliliter flask containing 90 milliliters of tetrahydrofuran and 10 milliliters of hexamethylphosphoramide. The flask was immersed in a Dry Ice acetone bath, the internal pressure was equilibrated with nitrogen and the reaction mixture was allowed to reach −10° C. At that temperature 2 grams (50 millimoles) of sodium amide was added in portions of about 0.2 gram. Upon completion of the reaction the presence of sodium trifluoroethylene was confirmed by preparation of trifluorovinyl cyclohexyl carbinol.

In a similar manner, potassium trifluoroethylene is prepared by the reaction of trifluoroethylene with potassium amide.

EXAMPLE 2

50 mmoles of $CF_2=CFH$ were condensed in a separatory funnel containing 10 mml. of tetrahydrofuran and 4.9 gr. (50 mmoles) of cyclohexanone. This solution was then added dropwise under a nitrogen atmosphere to a well-stirred suspension of 4 gr. (100 mmoles) of $NaNH_2$ in a mixture of 90 mml. of tetrahydrofuran and 10 mml. of hexamethylphosphoramide.

During the addition, the temperature in the flask was maintained at −10° C. After the addition, the reaction system was allowed to slowly reach room temperature. The solution was then poured onto 250 ml. of on ice cold 5% HCl solution. The resulting suspension was extracted three times with 100 ml. of ether and the organic phases together were washed with water and dried over magnesium sulfate. The residue obtained on evaporation of the solvent was then distilled under vacuo. There was obtained 5.85 gr. of trifluorovinyl cyclohexyl carbinol (65% yield).

EXAMPLE 3

50 mmoles of $CF_2=CFH$ was condensed under vacuo at liquid nitrogen temperature in a 500 ml. flask containing 90 ml. of tetrahydrofuran and 10 ml. of hexamethylphosphoramide. The flask was immersed in a Dry Ice acetone bath, the internal pressure was equilibrated with nitrogen and the reaction mixture was allowed to reach −10° C. When the temperature was fixed, 2 gr. (50 mmoles) of $NaNH_2$ was added in portions of about 0.2 gr. the addition of each portion being followed after 180 minutes by the addition of the stoichiometric amount of cyclohexanone. When the addition was completed, the temperature of the system was allowed to slowly reach room temperature and the reaction mixture was worked up following the procedure described in the preceding example. Distillation of the residue in a Voniga Kugelrohr distillation apparatus afforded 4.5 gr. (50% yield) of pure trifluorovinyl cyclohexyl carbinol having the following analysis: Calculated for $C_8H_{11}F_3O$ (percent): C, 53.38; H, 6.16. Found (percent): C, 52.90; H, 6.15.

EXAMPLES 4–9

In a manner similar to that employed in the previous examples other ketones were used for the preparation of the corresponding trifluorovinyl derivatives. The starting ketones products and yields, calculated on the amount of starting trifluoroethylene, are set forth in Table I below:

TABLE I

| | Fluoroethylene | Ketone | Product | Yield in weight percent |
|---|---|---|---|---|
| Example: | | | | |
| 4 | F₃C=CFNa | Cyclopentanone | OH, —CF=CF₃ on cyclopentane ring | 32 |
| 5 | F₃C=CFNa | di-Isobutylketone | (CH₃)₂CH—CH₂—C(OH)(CF=CF₂CH₃)—CH₂—CH(CH₃)₂ | 56 |
| 6 | F₃C=CFNa | Benzophenone | (C₆H₅)₂C(OH)(CF=CF₂) | 30 |
| 7 | F₃C=CFNa | Pinacolone | CH₃—C(CH₃)₂—C(CH₃)(OH)—CF=CF₂ | 40 |
| 8 | F₃C=CFNa | Acetophenone | C₆H₅—C(CH₃)(OH)—CF=CF₂ | 35 |
| 9 | F₃C=CFNa | Fluorenone | 9-fluorenyl, OH, CF=CF₂ | 75 |

Although the invention has been illustrated by the preceding examples, it is not to be construed as being limited to the materials employed therein, but rather, the invention encompasses the generic area as hereinbefore disclosed. Various modifications of this invention can be made without departing from the spirit and scope thereof.

What is claimed is:

1. A process for the preparation of fluoroethylenes of the formula:

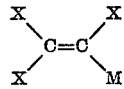

wherein M represents sodium or potassium, at least two X's represent a fluorine atom, and the remaining X's represent a member selected from the group consisting of hydrogen, fluorine, chlorine or alkyl, fluoroalkyl and perfluoroalkyl of up to 8 carbon atoms, said process comprised of contacting in an inert atmosphere and at a temperature within the range of from about −20° to about +10° C., sodium or potassium amide and a fluoroethylene of the formula:

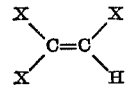

wherein X has the same value as above, said process being conducted in a reaction media comprised of hexamethylphosphoramide and at least one member selected from the group consisting of tetrahydrofuran and an organic ether.

2. The process of claim 1 wherein said reaction media is comprised of hexamethylphosphoramide and tetrahydrofuran.

3. The process of claim 1 wherein said reaction media is comprised of hexamethylphosphoramide and tetrahydrofuran in a respective volume ratio of about 1 to 9.

4. The process of claim 1 wherein said inert atmosphere is nitrogen.

5. The process of claim 1 wherein the fluoroethylene prepared by said process is sodium trifluoroethylene.

6. The process of claim 1 wherein the fluoroethylene prepared by said process is potassium trifluoroethylene.

7. The process of claim 1 wherein the fluoroethylene prepared by said process is cis and trans 1-sodium-1-chloro-2,2-difluoroethylene.

8. The process of claim 1 wherein the fluoroethylene prepared by said process is cis and trans 1-potassium-1-chloro-2,2-difluoroethylene.

References Cited
UNITED STATES PATENTS
3,560,531    2/1971    Normant _____ 260—665 R DANIEL D. HORWITZ, Primary Examiner U.S. Cl. X.R.

252—1; 260—468 C, 617 R, 618 D, 633, 648 F, 651 F; 424—633